United States Patent
Chiba

(10) Patent No.: US 8,971,454 B2
(45) Date of Patent: Mar. 3, 2015

(54) RADIO APPARATUS AND DATA REPRODUCING METHOD

(71) Applicant: JVC KENWOOD Corporation, Yokohama (JP)

(72) Inventor: Wakana Chiba, Sagamihara (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/054,574

(22) Filed: Oct. 15, 2013

(65) Prior Publication Data

US 2014/0112415 A1    Apr. 24, 2014

(30) Foreign Application Priority Data

Oct. 19, 2012 (JP) ................. 2012-231287

(51) Int. Cl.
*H04L 7/00* (2006.01)
*H04L 27/14* (2006.01)

(52) U.S. Cl.
CPC .............. *H04L 7/0087* (2013.01); *H04L 27/14* (2013.01)
USPC ........................................................ 375/316

(58) Field of Classification Search
CPC .............................. H04L 7/0087; H04L 27/14
USPC ........................................................ 375/316
See application file for complete search history.

(56) References Cited

U.S. PATENT DOCUMENTS

| 7,239,675 B2 * | 7/2007 | Zehavi et al. ................. 375/334 |
| 8,385,495 B2 * | 2/2013 | Shibata ......................... 375/365 |
| 2009/0060104 A1 * | 3/2009 | Sher et al. ..................... 375/345 |

FOREIGN PATENT DOCUMENTS

| JP | 06-085865 | 3/1994 |
| JP | 08-023328 | 1/1996 |

* cited by examiner

*Primary Examiner* — Juan A Torres
(74) *Attorney, Agent, or Firm* — Venable LLP; Michael A. Sartori

(57) ABSTRACT

A radio apparatus receives a received signal having a frame structure with a synchronization word field interposed between anterior half part data and posterior half part data. The radio apparatus includes: a storage unit that sequentially stores predetermined time length of detected wave data; a synchronization detecting unit that detects a synchronization word from the detected wave data; a symbol timing detecting unit that determines a symbol timing of the detected wave data from the synchronization word; a DC offset detecting unit that detects a DC offset in the detected wave data from the synchronization word; and a data reproducing unit that extracts detected data for every symbol timing from detected wave data of the anterior half part data at a time when the synchronization word is detected, and cancels the DC offset from the detected wave data for every symbol timing so as to extract a symbol value.

3 Claims, 3 Drawing Sheets

RADIO APPARATUS AND DATA REPRODUCING METHOD

CROSS-REFERENCE TO RELATED APPLICATIONS

This application is based upon and claims the benefit of priority from Japanese Patent Application No. 2012-231287, filed on Oct. 19, 2012, the entire contents of which are incorporated herein by reference.

BACKGROUND OF THE INVENTION

1. Field of the Invention

The present invention relates to a radio apparatus and a data reproducing method.

2. Description of the Related Art

Conventionally, the received signal modulated by the frequency modulation system such as the 4 level FSK (Frequency Shift Keying) includes a synchronization word (Frame-Sync-Word) for the synchronization at the receiver side. After the frame synchronization using the synchronization word included in the received signal, the receiver demodulates the received signal.

For example, Japanese Patent Application Laid-open No. 6-85865 discloses the art in which the received data is stored in advance and, after the synchronization is established, the DC offset is cancelled from the stored received data. Further, Japanese Patent Application Laid-open No. 8-23328 discloses the art in which the data of a predetermined number of bits before and after the normal anterior half part data position is obtained after the synchronization word is detected; and out of the obtained data, the data in the position that corresponds to the bit displacement detected at the time of the detection of the synchronization word is reproduced as the anterior half part data.

However, when the received signal has the frame structure in which the anterior half part data and the posterior half part data are separated interposing the synchronization word, it is necessary, in the synchronization detection at the time of the initial synchronization, to include the detected wave data that is unnecessary for the reproduction of the anterior half part data to perform the symbol detection, in order to prevent the clipping off of the beginning of the data reproduction due to the anterior half part data being unable to be demodulated. Therefore, unnecessary process is caused resulting in longer data reproduction time, and there is a problem that some systems require to wait for a few frames in order to ensure the next anterior half part data.

SUMMARY OF THE INVENTION

There is a need to at least partially solve the problems in the conventional technology.

According to an aspect of the present invention, provided is a radio apparatus configured to receive a received signal having a frame structure in which a synchronization word field is interposed between anterior half part data and posterior half part data. The radio apparatus includes: a receiving unit configured to detect the received signal and to output detected wave data; a storage unit configured to sequentially store a predetermined time length of the detected wave data; a synchronization detecting unit configured to detect a synchronization word from the detected wave data stored in the storage unit; a symbol timing detecting unit configured to determine a symbol timing of the detected wave data stored in the storage unit from the synchronization word; a DC offset detecting unit configured to detect a DC offset in the detected wave data stored in the storage unit from the synchronization word; and a data reproducing unit configured to extract detected data for every symbol timing detected by the symbol timing detecting unit from detected wave data of the anterior half part data stored in the storage unit at a time when the synchronization word is detected by the synchronization detecting unit, and to cancel the DC offset detected by the DC offset detecting unit from the detected wave data for every symbol timing so as to extract a symbol value.

According to another aspect of the present invention, provided is a reproducing method for reproducing a received signal having a frame structure in which a synchronization word field is interposed between anterior half part data and posterior half part data. The method includes: a receiving step for detecting the received signal and outputting detected wave data; a storage step for sequentially storing a predetermined time length of the detected wave data; a synchronization detecting step for detecting a synchronization word from the detected wave data stored in the storage unit; a symbol timing detecting step for determining a symbol timing of the detected wave data stored in the storage unit from the synchronization word; a DC offset detecting step for detecting a DC offset in the detected wave data stored in the storage unit from the synchronization word; and a data reproducing step for extracting detected wave data for every symbol timing detected by the symbol timing detecting unit from detected wave data of the anterior half part data stored in the storage unit at a time when the synchronization word is detected by the synchronization detecting unit, and for canceling the DC offset detected by the DC offset detecting unit from the detected wave data for every symbol timing so as to extract a symbol value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
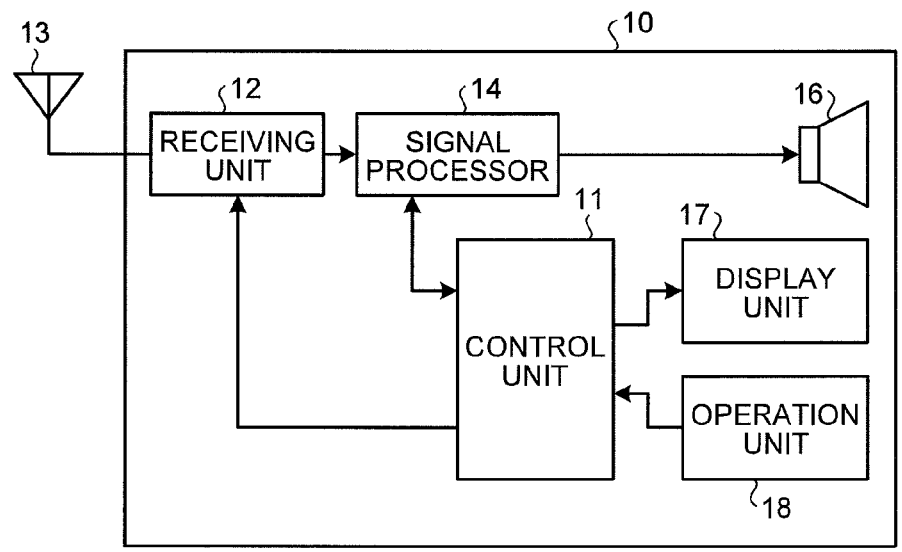
FIG. 1 is a block diagram illustrating a general configuration of a radio apparatus according an embodiment of the present invention.

A radio apparatus and a data reproducing method according to one embodiment of the present invention will be described below in detail by referring to the drawings.

FIG. 1 is a block diagram illustrating a general configuration of the radio apparatus according the embodiment. As illustrated in FIG. 1, a radio apparatus 10 includes a control unit 11, a receiving unit (tuner) 12 and an antenna 13, a signal processer 14, a voice output unit 16, a display unit 17, and an operation unit 18. It is noted that the radio apparatus 10 may be a radio transceiver of the TDMA (Time Division Multiple Access) system employing the multilevel FSK.

The receiving unit 12 detects, from the received signal received at the antenna 13, a multilevel FSK modulation signal of the carrier wave (carrier) instructed by the control unit 11 and outputs the obtained detected wave data to the signal processor 14. According to the control instruction from the control unit 11, the signal processor 14 obtains the symbol value of the received data from the inputted detected wave data, extracts the audio signal from the voice data included in the obtained received data, and outputs it to the voice output unit 16 for reproduction. Further, the signal processor 14 outputs, out of the obtained received data, the non-voice data signal containing the information such as various parameters to the control unit 11. It is noted that the frame structure of the received signal in the present embodiment has the frame structure in which a synchronization word field is interposed between the anterior half part data and the posterior half part data. Further, respective data lengths of the anterior half part data, the synchronization word, and the posterior half part data have the predefined fixed lengths.

The voice output unit 16 is configured with a speaker and the like and configured to output the audio signal inputted from the signal processor 14 as the voice, according to the control instruction from the control unit 11. The display unit 17 is configured with a liquid crystal display, an organic EL (Electro Luminescence) display, an LED (Light Emitting Diode) display, and the like and configured to properly display the content of the non-voice data signal included in the received data, according to the control instruction from the control unit 11. The operation unit 18 is configured with switches such as an operating key, a cross key, a joystick, a jog dial, a touch panel, and configured to accept the operating input by the user and to input it to the control unit 11.

The control unit 11 manages and controls the entire radio apparatus 10 by a semiconductor integrated circuit including a central processing unit (CPU), a ROM in which a program and the like is stored, a RAM as a work area, and so on.

Figure 2:
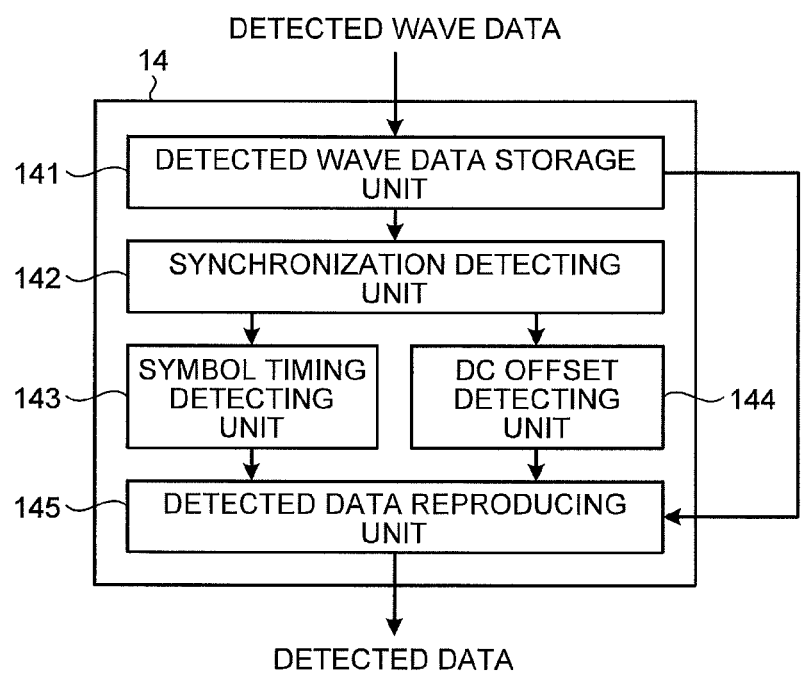
FIG. 2 is a block diagram illustrating an example of a functional configuration of a signal processor in FIG. 1.

FIG. 2 is a block diagram illustrating an example of a functional configuration of the signal processor 14 in FIG. 1. The signal processor 14 includes a detected wave data storage unit 141, a synchronization detecting unit 142, a symbol timing detecting unit 143, a DC offset detecting unit 144, and a detected data reproducing unit 145. The signal processor 14 may be implemented by a dedicated chip into which above respective units are embedded, or may be implemented as a function of a part of the receiving unit 12.

The detected wave data storage unit 141 is a buffer that continues to repeatedly store the detected wave data for a predetermined length of time. Specifically, the detected wave data storage unit 141 always discards old detected wave data according to the elapse of time and stores new detected wave data. The synchronization detecting unit 142 detects the synchronization with respect to the detected wave data obtained via the detected wave data storage unit 141. The symbol timing detecting unit 143 detects the symbol timing from the synchronization word in the detected wave data resulted after the synchronization detection. The DC offset detecting unit 144 detects the DC offset from the synchronization word in the detected wave data resulted after the synchronization detection. The detected data reproducing unit 145 uses the detected symbol timing and DC offset to obtain the symbol value of the received data and reproduces it.

It is noted that the detected wave data storage unit 141 may be the storage field of the predetermined length (the number of bits). This predetermined length may be a length that corresponds to at least the sum of the anterior half part data and the synchronization word (for example, see the anterior half part data 111 and the synchronization word 112 in the detected wave data storage unit 141 in FIG. 5). In this case, at the time when the synchronization word is detected by the synchronization detecting unit 142, the detected wave data storage unit 141 is in a state where it stores the synchronization word (of the detected wave data) in the posterior half section and stores the anterior half part data (of the detected wave data) in the anterior half section.

Next, the operation of each unit illustrated in FIG. 2 will be described in detail by referring to the flowchart illustrated in FIG. 3 and the conceptual diagrams illustrated in FIG. 4 and FIG. 5. It is noted that the detected wave data obtained by the receiving unit 12 detecting the received signal is sequentially inputted to the signal processor 14 illustrated in FIG. 2.

Figure 3:
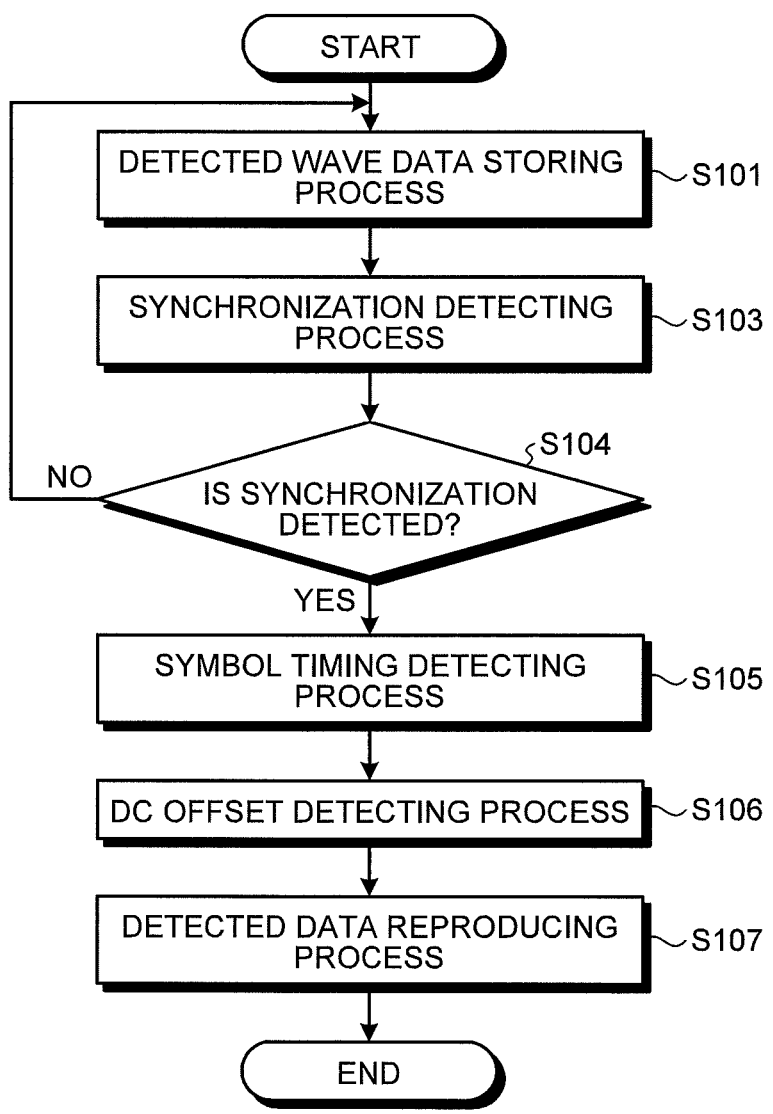
FIG. 3 is a flowchart illustrating the operation of each unit illustrated in FIG. 2.
Figure 4:
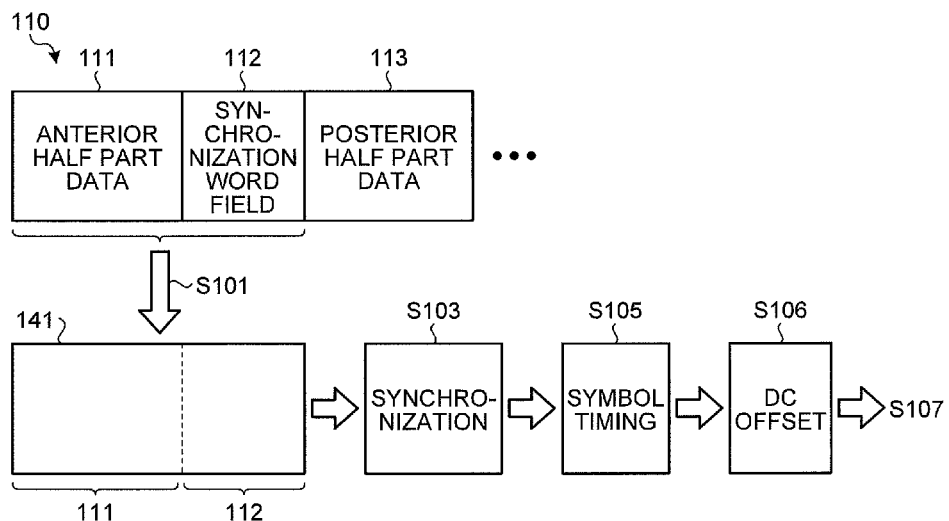
FIG. 4 is a conceptual diagram for illustrating the operation of steps S101 to S106 in FIG. 3.
Figure 5:
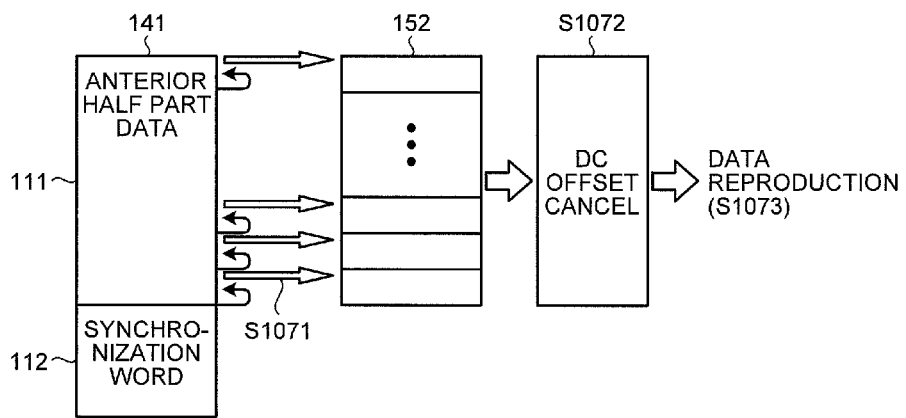
FIG. 5 is a conceptual diagram for illustrating a specific example of the operation of step S107 in FIG. 3.

First, as illustrated in step S101 of FIG. 3 and FIG. 4, the detected wave data storage unit 141 stores a predetermined time length of the detected wave data inputted from the receiving unit 12. Further, the detected wave data storage unit 141 outputs the stored detected wave data to the synchronization detecting unit 142.

Next, as illustrated in step S103 of FIG. 3 and FIG. 4, the synchronization detecting unit 142 executes the synchronization detecting process to the inputted detected wave data. This synchronization detecting process may be a synchronization detecting process of using a predefined fixed pattern to detect the synchronization word.

Next, as illustrated in step S104 of FIG. 3, the synchronization detecting unit 142 determines whether or not the synchronization word has been detected and, if not (NO in step S104), returns to step S101 to execute the process for the next detected wave data stored in the detected wave data storage unit 141. On the other hand, if the synchronization word has been detected (YES in step S104), the synchronization detecting unit 142 inputs the synchronization word out of the synchronized detected wave data into the symbol timing detecting unit 143 and the DC offset detecting unit 144, respectively.

In step S105 of FIG. 3 and FIG. 4, the symbol timing detecting unit 143 executes the symbol timing detecting process for detecting the symbol timing from the inputted synchronization word. Further, step S106 of FIG. 3 and FIG. 4, the DC offset detecting unit 144 executes the DC offset detecting process for detecting the DC offset from the synchronization word. The detected symbol timing and DC offset are inputted into the detected data reproducing unit 145, respectively.

In step S107, as illustrated in FIG. 3, the detected data reproducing unit 145 executes the reproducing of the detected data using the symbol timing and the DC offset. Specifically, as illustrated in FIG. 5, the detected data reproducing unit 145 reads out the detected wave data for each symbol timing of the anterior half part data 111 that has been stored in the detected wave data storage unit 141 at the time when the synchronization is detected by step S103 of FIG. 3 (S1071). The detected wave data for each symbol timing may be stored in a detected data memory 152 that is a buffer, for example. This detected data memory 152 may be provided within the signal processor 14.

Further, the detected data reproducing unit 145 cancels, from the detected wave data for each symbol timing, the DC offset detected by the DC offset detecting unit 144 (step S1072). The symbol value that is the data for reproduction is obtained through this operation. Afterward, the received data is detected from the obtained symbol value; and the audio signal is extracted from the voice data signal out of the received data to be outputted to the voice output unit 16 for reproduction (step S1073). It is noted that the non-voice data signal included in the obtained received data may be inputted into the control unit 11 and be displayed on the display unit 17, if appropriate.

It is noted that, while the reproducing operation for the anterior half part data 111 provided before the synchronization word 112 in the frame 110 has been described above, the operation for the posterior half part data 113 provided after the synchronization word and the next frame after the synchronization detection may be the same as a usual operation. The usual operation here may be an operation of using the symbol timing and/or the DC offset detected from the synchronization word by the above operation to extract the symbol value for the data resulted after the synchronization word detection. A configuration for implementing this usual operation may be such the radio apparatus 10 separately is configured for that purpose, or such that a part of the process executed by the signal processor 14 of the present embodiment is used.

As described above, the present embodiment is configured to perform no symbol detection before the synchronization is detected and to perform the symbol detection after the synchronization has been detected, which can prevent the execution of the useless process for the detected data that is unnecessary for the reproduction of the anterior half part data. This allows for the highly accurate reproduction of the anterior half part data occurring before the synchronization detection, without causing the unnecessary increase in the data reproduction time.

Further, in the present embodiment, the DC offset is detected from the synchronization word resulted after the synchronization detection, and this DC offset is used to correct the stored anterior half part data, so that the accuracy of the reproduction can be further improved.

Furthermore, in the present embodiment, the memory (detected wave data storage unit 141) secured for the data reproduction can be the length corresponding to the sum of the anterior half part data and the synchronization word. As a result, the required memory capacity can be suppressed.

Furthermore, the present embodiment allows for the accurate and fast symbol detection for the anterior half part data of which symbol timing and DC offset are undefined, so that redundancy in the reproduction time and deterioration in the accuracy of the reproduction can be suppressed.

The present embodiment described above is applied to a case in which the operation is rendered on the first frame. However, even in a the two-slot TDMA where there may be a burst operation of the data present/absent for every one slot, the synchronization to the subsequent slot can be typically obtained without any problem as long as the synchronization is established for the first slot (corresponding to the frame 110 of the present embodiment). While receiving a long time, however, since the frequency may shift and cause the change in the offset, and the symbol timing may shift; the operation of the present embodiment may be performed periodically. Of course, the symbol value of the anterior half part data may be derived for all the slots by the operation of the present embodiment.

The present invention allows for achieving the radio apparatus and the data reproducing method that is able to reproduce, with a high accuracy, the anterior half part data occurring before the synchronization detection without causing the unnecessary increase in the data reproduction time.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio apparatus configured to receive a received signal having a frame structure in which a synchronization word field is interposed between anterior half part data and posterior half part data, the radio apparatus comprising:
   a receiving unit configured to detect the received signal and to output detected wave data;
   a storage unit configured to sequentially store a predetermined time length of the detected wave data;
   a synchronization detecting unit configured to detect a synchronization word from the detected wave data stored in the storage unit;
   a symbol timing detecting unit configured to determine a symbol timing of the detected wave data stored in the storage unit from the synchronization word;
   a DC offset detecting unit configured to detect a DC offset in the detected wave data stored in the storage unit from the synchronization word; and
   a data reproducing unit adapted
      to extract detected data for every symbol timing detected by the symbol timing detecting unit from detected wave data of the anterior half part data stored in the storage unit at a time when the synchronization word is detected by the synchronization detecting unit, and
      to cancel the DC offset detected by the DC offset detecting unit from the detected wave data for every symbol timing so as to extract a symbol value.

2. The radio apparatus according to claim 1, wherein the predetermined time length is a length corresponding to at least a sum of the anterior half part data and the synchronization word.

3. A reproducing method for reproducing a received signal having a frame structure in which a synchronization word field is interposed between anterior half part data and posterior half part data, the method comprising:
   a receiving step for detecting the received signal and outputting detected wave data;
   a storage step for sequentially storing a predetermined time length of the detected wave data;
   a synchronization detecting step for detecting a synchronization word from the detected wave data stored in the storage unit;
   a symbol timing detecting step for determining a symbol timing of the detected wave data stored in the storage unit from the synchronization word;
   a DC offset detecting step for detecting a DC offset in the detected wave data stored in the storage unit from the synchronization word; and
   a data reproducing step
      for extracting detected wave data for every symbol timing detected by the symbol timing detecting unit from detected wave data of the anterior half part data stored in the storage unit at a time when the synchronization word is detected by the synchronization detecting unit, and
      for canceling the DC offset detected by the DC offset detecting unit from the detected wave data for every symbol timing so as to extract a symbol value.

* * * * *